(12) United States Patent
Hernandez

(10) Patent No.: US 7,966,365 B2
(45) Date of Patent: Jun. 21, 2011

(54) SYSTEM AND METHOD FOR SCHEDULING DEVICE MANAGEMENT

(75) Inventor: Pablo Hernandez, Paris (FR)

(73) Assignee: LG Electronics Inc., Seoul (KR)

(*) Notice: Subject to any disclaimer, the term of this patent is extended or adjusted under 35 U.S.C. 154(b) by 868 days.

(21) Appl. No.: 11/815,001

(22) PCT Filed: Apr. 5, 2006

(86) PCT No.: PCT/KR2006/001258
§ 371 (c)(1),
(2), (4) Date: Jul. 27, 2007

(87) PCT Pub. No.: WO2006/115338
PCT Pub. Date: Nov. 2, 2006

(65) Prior Publication Data
US 2008/0168127 A1    Jul. 10, 2008

(30) Foreign Application Priority Data
Apr. 4, 2006  (KR) .................... 10-2006-0030737

(51) Int. Cl.
G06F 15/16 (2006.01)
G06F 15/173 (2006.01)
G06F 9/46 (2006.01)
(52) U.S. Cl. ......... 709/202; 709/223; 709/224; 718/102
(58) Field of Classification Search .......... 709/223–224, 709/202; 717/168
See application file for complete search history.

(56) References Cited

U.S. PATENT DOCUMENTS

| 5,732,275 | A | * | 3/1998 | Kullick et al. ................. 717/170 |
| 5,748,100 | A | * | 5/1998 | Gutman et al. .............. 340/7.22 |
| 5,887,254 | A | * | 3/1999 | Halonen ....................... 455/419 |

(Continued)

FOREIGN PATENT DOCUMENTS

CN    2293133 Y    9/1998

(Continued)

OTHER PUBLICATIONS

Mobile Phone A3618: "Eriksson, second edition"—Apr. 2001, Eriksson Mobile Communications AB 2001, publication No. RU/LZT 108 4517 R2A Innovatron patents /3/, p. 25.

*Primary Examiner* — Rupal D Dharia
*Assistant Examiner* — Robert B McAdams
(74) *Attorney, Agent, or Firm* — Birch, Stewart, Kolasch & Birch, LLP

(57) ABSTRACT

A device management system and a device management command scheduling method in the system, wherein the device management system comprises a server for generating a device management scheduling context including a device management command and a condition to execute the device management command and then transmitting the generated device management scheduling context to a terminal, and the terminal provided with a first module for receiving the device management context from the server, a second module for scheduling a device management by setting the device management command and the condition to execute the device management command using the received device management scheduling context, a third module for monitoring whether the condition is satisfied together with an on/off state of power, and a fourth module for executing the scheduled device management command according to the result of the monitoring, whereby it is possible to prevent a failure of performing the device management due to power-off.

4 Claims, 5 Drawing Sheets

U.S. PATENT DOCUMENTS

| | | | |
|---|---|---|---|
| 6,282,709 B1* | 8/2001 | Reha et al. | 717/175 |
| 7,702,322 B1* | 4/2010 | Maurya et al. | 455/419 |
| 2003/0009705 A1* | 1/2003 | Thelander et al. | 713/340 |
| 2003/0084138 A1* | 5/2003 | Tavis et al. | 709/223 |
| 2004/0015941 A1* | 1/2004 | Sekine | 717/168 |
| 2004/0054995 A1* | 3/2004 | Lee | 717/173 |
| 2004/0093592 A1* | 5/2004 | Rao | 717/168 |
| 2005/0186952 A1* | 8/2005 | Kitajima | 455/419 |
| 2006/0053417 A1* | 3/2006 | Henderson et al. | 717/168 |

FOREIGN PATENT DOCUMENTS

| | | |
|---|---|---|
| CN | 1390008 A | 1/2003 |
| JP | 02-029833 A | 1/1990 |
| JP | 06-282457 A | 10/1994 |
| JP | 2002-94912 A | 3/2002 |
| JP | 2003-068865 A | 3/2003 |
| JP | 2003-208316 | 7/2003 |
| JP | 2003-345622 A | 12/2003 |
| JP | 2004-348294 A | 12/2004 |

* cited by examiner

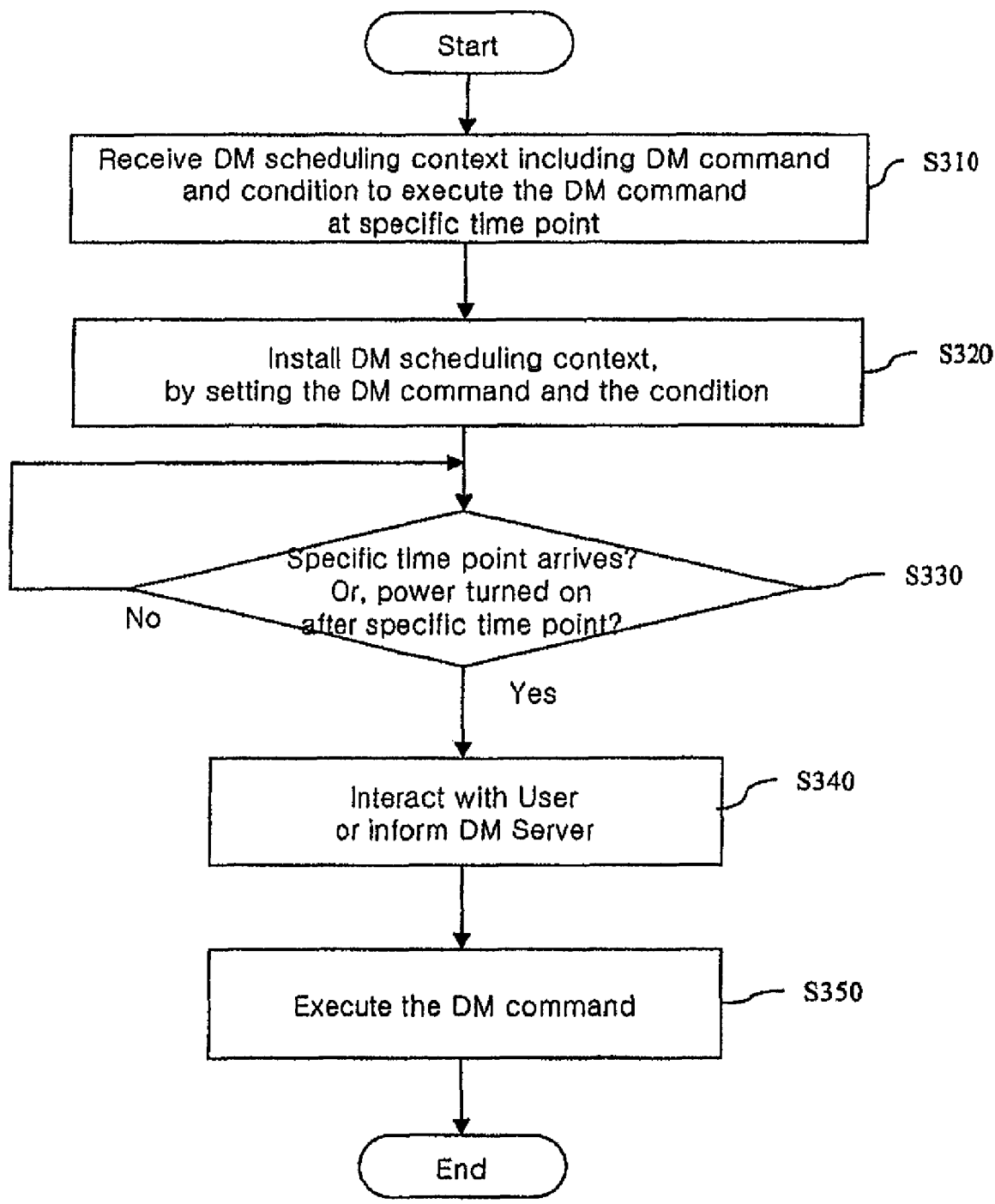

SYSTEM AND METHOD FOR SCHEDULING DEVICE MANAGEMENT

TECHNICAL FIELD

The present invention relates to a device management system and a device management scheduling method in the system.

BACKGROUND ART

In general, a Device Management (DM) technique is a type of technique which is capable of easily managing a client (i.e., a terminal) by a DM server by showing resources which the client has to the DM server in a format of a management object existing on a DM tree, and permitting the DM server to access the resources.

A DM scheduling technique includes the DM technique, by which the DM can be performed according to a preset schedule.

Regarding the DM scheduling technique, the inventor of the present application recognized that the DM was disable to be performed during power-off. In particularly, the inventor recognized that in case of performing the scheduling under a time-based condition, if the power was off, the DM could not be performed.

DISCLOSURE OF THE INVENTION

Therefore, it is an object of the present invention to overcome the disadvantage that a device management is disable to be performed due to power-off.

To achieve these objects, there is provided a device management system comprising: a server for generating a device management scheduling context including a device management command and a condition to execute the device management command to transmit it to a terminal; and the terminal including a first module for receiving the device management scheduling context, a second module for scheduling a device management by setting the device management command and the condition using the received device management scheduling context, a third module for monitoring whether the condition is satisfied together with an on/off state of power, and a fourth module for executing the scheduled device management command according to the result of the monitoring.

Here, the set condition may denote whether a power-off command has been received from a user, and the device management command may be executed when it is monitored that the power-off command has been received from the user. Furthermore, the set condition may be a certain time interval, and the device management command may be executed when it is monitored that the power-off command has been received from the user even before the certain time interval. In addition, the set condition may denote a specific time point, and the device management command may be executed when it is monitored that power was in a turn-off state at the specific time point but the power is then turned on after the specific time point.

According to another embodiment of the present invention, there is also provided a terminal comprising: a first module for scheduling a device management by setting a device management command and a condition to execute the device management command; a second module for monitoring whether the condition is satisfied together with an on/off state of power; and a third module for executing the scheduled device management command according to the result of the monitoring.

BRIEF DESCRIPTION OF THE DRAWINGS

FIG. 5 is a flow chart illustrating sequential steps of a device management scheduling method in accordance with a third embodiment of the present invention.

MODES FOR CARRYING OUT THE PREFERRED EMBODIMENTS

Reference will now be made in detail to the preferred embodiments of the present invention, examples of which are illustrated in the accompanying drawings. It will also be apparent to those skilled in the art that various modifications and variations can be made in the present invention without departing from the spirit or scope of the invention. Thus, it is intended that the present invention cover modifications and variations of this invention provided they arrives within the scope of the appended claims and their equivalents.

Figure 1:
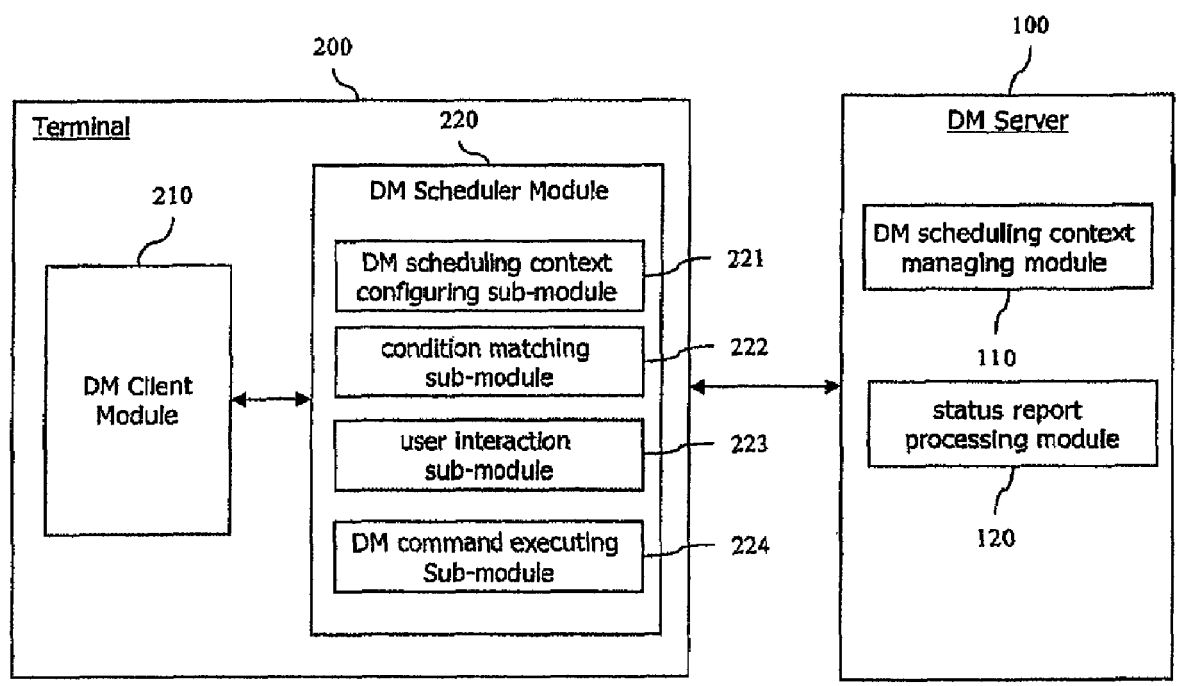
FIG. 1 is a view illustrating a configuration of a device management system according to the present invention.

FIG. 1 is a view illustrating a configuration of a device management system according to the present invention.

As illustrated in FIG. 1, a Device Management (DM) system according to the present invention may be provided with a DM server 100 and a terminal 200.

The DM server 100 may include a DM scheduling context managing module 110 and a status report processing module 120.

The DM scheduling context managing module 110 refers to a unit for generating a DM scheduling context including a DM command to be executed in the terminal 200 and a condition to execute the DM command to then transmit it to the terminal 200. Here, the condition may correspond to a reception of a power-off command from the user, a certain time interval for executing the DM command, and a specific time point for executing the DM command. In case that the condition to execute the DM command is satisfied, on the other hand, if the terminal 200 has not successfully executed the DM command due to power-off, the DM scheduling context managing module 110 may transmit the DM scheduling context by including therein a condition-value which is related to whether to perform a user interaction for the information (i.e., the information that the DM command has not successfully been executed due to the power-off), or whether to inform the DM server 100 of the information.

In the meantime, the status report processing module 120 refers to a unit for receiving a status report, namely, whether the condition is satisfied, from the terminal 200, to thereafter processing the report.

The terminal 200, as illustrated in the drawing, includes a DM client module 210 and a DM scheduler module 220.

The DM client module 210 refers to a unit for receiving the DM scheduling context from the DM server 100 and executing the DM command.

The DM scheduler module 220 may include in more detail a DM scheduling context configuring sub module 221, a condition matching (satisfying) sub module 222, a user interaction sub module 223, and a DM command executing sub module 224.

First, the DM scheduling context configuring sub module 221 refers to a unit for installing the DM scheduling context received from the DM server 100 via the DM client module 210, by setting the DM command and the condition in the terminal 200. Here, the condition, as illustrated in the drawing, may denote whether a power-off command has been received from the user, whether a certain time interval for executing the DM command arrives, or whether a specific time point for executing the DM command arrives. In addition, the DM scheduling context configuring sub module 221 can set the condition-value within the terminal 200 when the DM server 100 transmits the DM scheduling context including the condition-value as aforementioned.

The condition matching sub module 222 refers to a unit for monitoring whether the condition is satisfied. In more detail, the condition matching sub module 222 can monitor the condition together with an on/off state of power. Here, the condition matching sub module 222 can monitor whether a power-off command has been received from the user, whether the certain time interval arrives or the power-off command has been received from the user even though the certain time interval does not arrive, or whether the specific time point arrives, or whether the DM command has failed to be executed because the power was off at the specific time point even if the power was on after the specific time point. Explanation therefor will be explained in more detail in FIG. 2 to be explained later.

The user interaction sub module 223 refers to a unit for performing a user interaction procedure if necessary or according to the condition-value when the condition to execute the DM command is satisfied by the condition matching sub module 222. When having failed to execute the DM command by the condition matching sub module 222 due to the power-off, the user interaction sub module 223 may interact with the user with respect to the fact (i.e. failure of executing the command) according to the condition-value or can inform the DM server 100 of the fact.

The DM command executing sub module 224 refers to a unit for executing the DM command by interworking with the DM client module 210 when the condition matching sub module 222 determines the condition to execute the DM command is satisfied and a user, if necessary, grants the executing of the DM command by use of the user interaction sub module 223, which will be explained in more detail in FIG. 2 to be described later.

So far, the configuration of the DM system according to the present invention has been explained, in which the DM server is provided with the DM scheduling context managing module 10 and the status report processing module 120, while the terminal 200 is provided with the DM client module 210, and the DM scheduler module 220 including the DM scheduling context configuring sub module 221, the condition matching sub module 222, the user interaction sub module 223 and the DM command executing sub module 224. However, the DM server 100 and the terminal 200 may be configured by combining a processor (not shown), a network interface (not shown) and a storage unit (not shown).

Hereinafter, an operation for executing the DM command in the DM system according to the present invention having such configuration will now be explained in more detail with reference to FIG. 2. However, FIG. 2 does not illustrate all of the detailed components in order to reduce complexity of the drawing but only illustrates the DM server 100 and the terminal 200. It must be regarded that each operation shown in the drawing is achieved by the detailed components of the DM server and the terminal 200.

Figure 2:
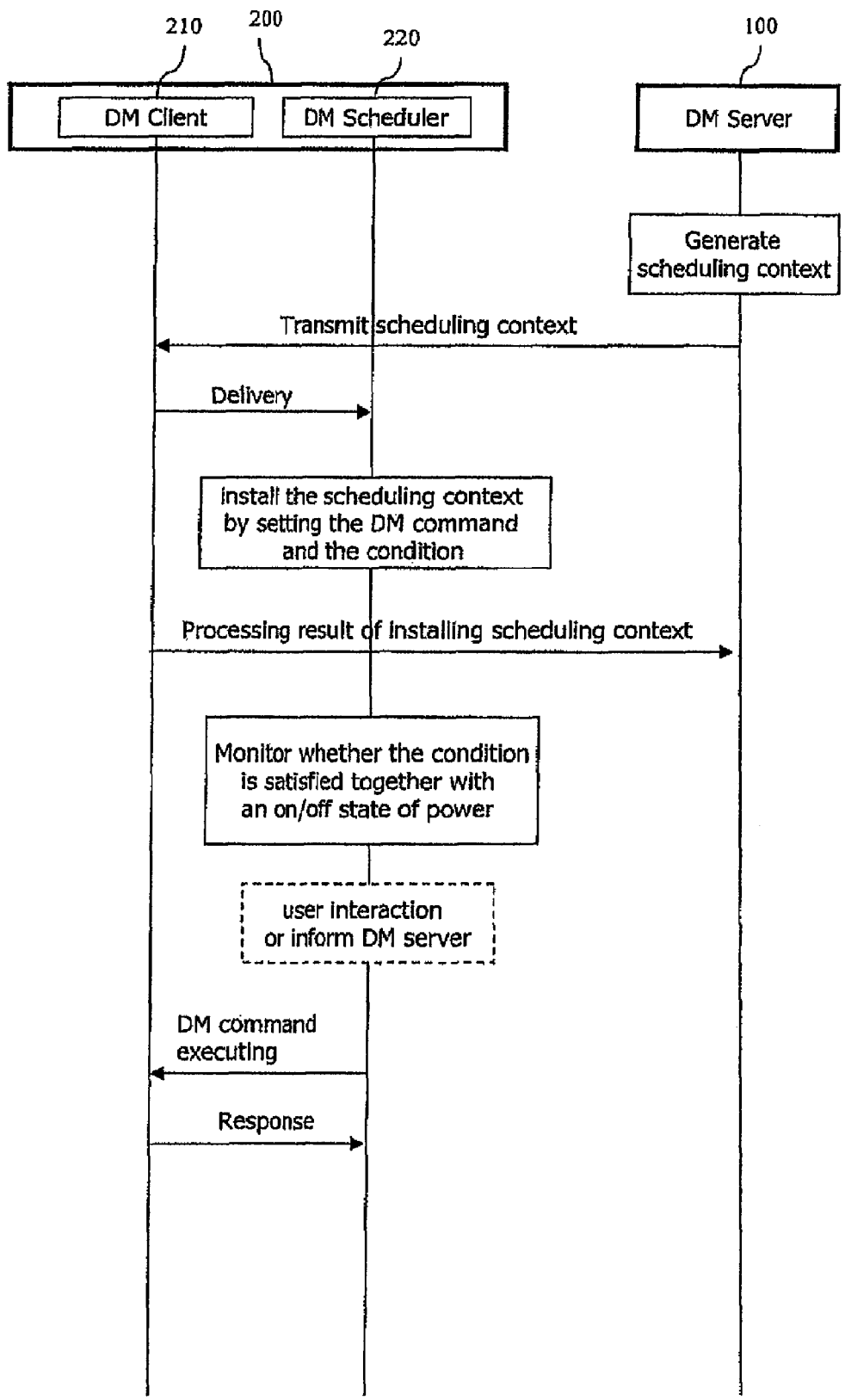
FIG. 2 is an exemplary view illustrating an operation of the device management system illustrated in FIG. 1 according to the present invention.

FIG. 2 is an exemplary view illustrating an operation of the DM system illustrated in FIG. 1 according to the present invention. Each operation will now be explained with reference to FIG. 2.

1) First, the DM server 100 generates a DM scheduling context including a DM command and a condition to execute the DM command. Here, the DM server 100 may include the aforementioned condition-value in the DM scheduling context.

The condition, on the other hand, may correspond to whether a power-off command has been received from the user, whether a certain time interval for executing the DM command arrives, or whether a specific time point for executing the DM command arrives.

2) The DM server 100 then establishes a DM session with the terminal 200, and uses a DM protocol to transmit the generated DM scheduling context to the DM client module 210 of the terminal 200.

3) The DM scheduler module 220 of the terminal 200 (in detail, the DM scheduling context configuring sub module 221) installs the received DM scheduling context by setting the DM command and the condition.

4) Upon completing the installing operation, the DM client 210 reports the processing result of installing the DM scheduling context to the DM server 100.

5) Afterwards, the DM scheduler module 220 (in detail, the condition matching sub module 222 of the DM scheduler module 220) monitors whether the condition to execute the DM command is satisfied. Here, the DM scheduler module 220 can monitor the condition together with an on/off state of power.

In more detail, the DM scheduler module 220 can monitor whether the power-off command has been received from the user, whether the certain time interval arrives or whether the power-off command has been received from the user even before the certain time interval arrives, whether the specific time point arrives, or whether the power has been turned on after the specific time point.

6) When it is monitored that the condition is satisfied, the DM scheduler module 220 (in detail, the user interaction sub module 223) selectively performs the user interaction. In contrary, when the command executing sub module 224 has failed to execute the DM command on time due to the power-off of the terminal 200, the DM scheduler module 220 performs the user interaction with respect to the fact or notifies the DM server 100 thereof. Here, the user interaction process can be performed such that a content related to the DM operation to be performed is displayed, and accordingly the user may grant an immediate executing of the DM command or may not grant it.

7) Then, the DM scheduler module 220 (in detail, the DM command executing sub module 224) executes the scheduled DM command by interworking with the DM client module 210.

As aforementioned so far, the operation processes of the system according to the present invention has been explained with reference to FIG. Hereinafter, DM scheduling methods capable of being implemented in the client illustrated in FIG. 1 will now be explained.

Figure 3:
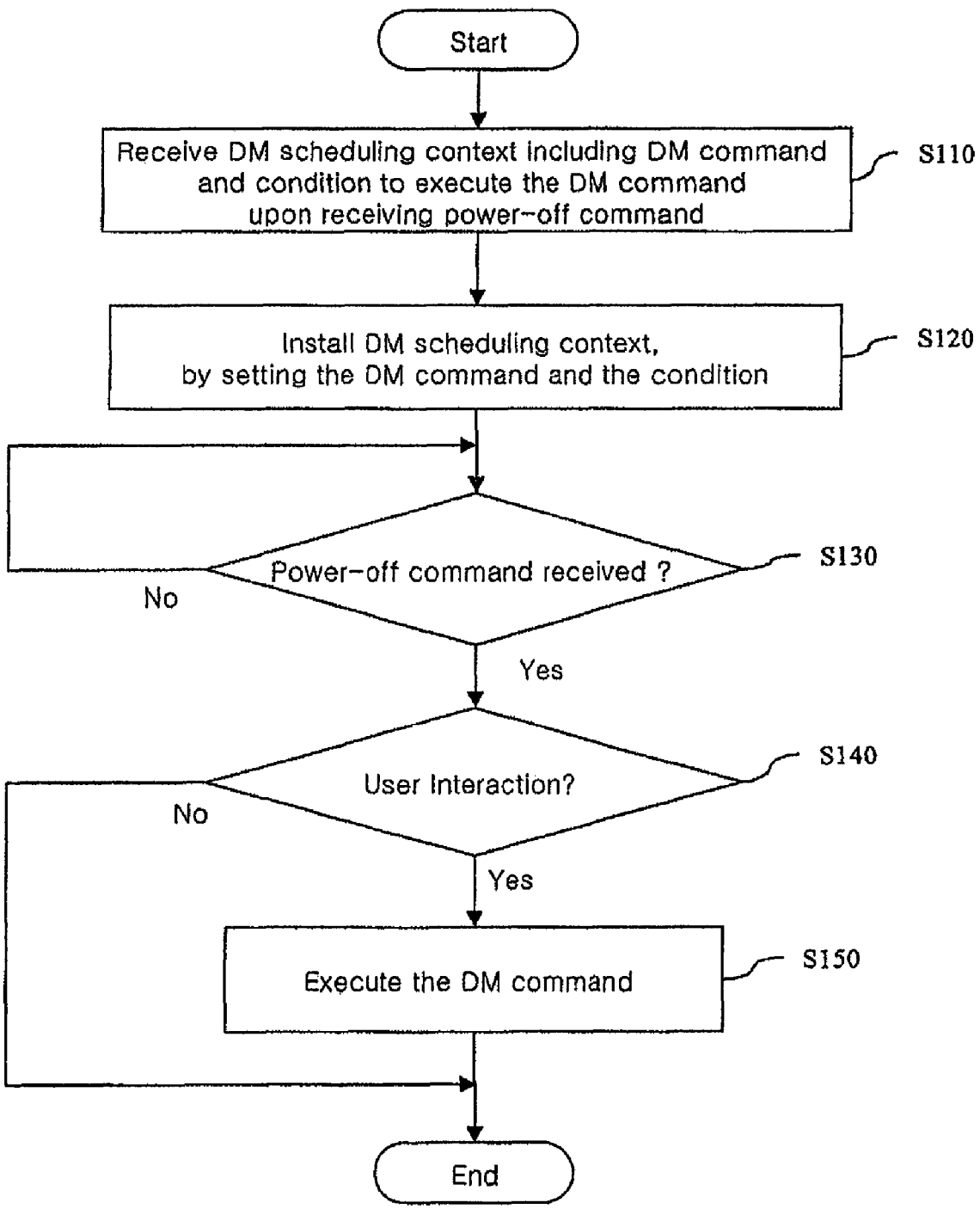
FIG. 3 is a flow chart illustrating sequential steps of a device management scheduling method a in accordance with a first embodiment of the present invention.

FIG. 3 is a flow chart illustrating a DM scheduling method in accordance with a first embodiment of the present invention.

As illustrated in FIG. 3, in order to overcome the problem of the related art that the DM command failed to be executed due to the power-off, a method for executing the DM command upon receiving a power-off command is introduced.

First, a client 200 (i.e. the terminal) receives a DM scheduling context including a DM command and a condition to execute the DM command when receiving a power-off command from a user (S110). Here, the received DM scheduling context may also include a condition-value as aforementioned.

Then, the terminal 200 installs the DM scheduling context by setting the DM command and the condition (S120).

Upon completing the installing (S120), the terminal 200 monitors the condition, namely, whether the power-off command has been received from the user (S130).

If it is monitored that the power-off command has been received (S130), the terminal 200 selectively performs the user interaction according to the aforementioned condition-value (S140). Here, if the user does not grant the executing of the DM command, the process is terminated.

However, if the user grants the executing of the DM command, the terminal 200 executes the DM command (S150).

Figure 4:
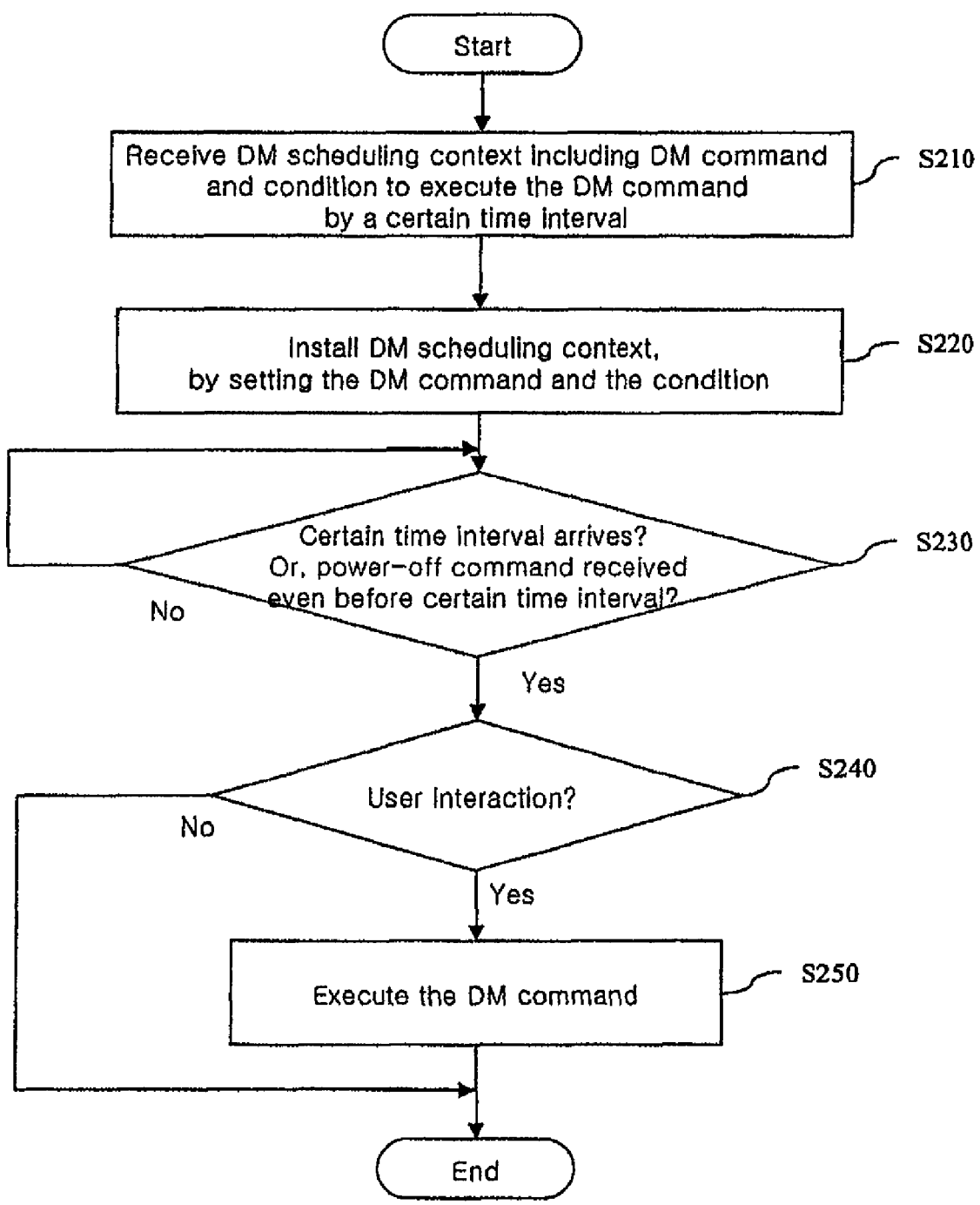
FIG. 4 is a flow chart illustrating sequential steps of a device management scheduling method in accordance with a second embodiment of the present invention.

FIG. 4, on the other hand, is a flow chart illustrating a DM scheduling method in accordance with a second embodiment of the present invention.

FIG. 4 illustrates a method for executing the DM command upon receiving the power-off command even before a certain time interval, in order to overcome the problem of the related art that the DM command failed to be executed because the power was off before the certain interval corresponding to the condition to execute the DM command.

First, the terminal 200 receives a DM scheduling context including a DM command and a condition to execute the DM command by a certain time interval (S210). Here, the received DM scheduling context may also include the condition-value as aforementioned.

Then, the terminal 200 installs the DM scheduling context by setting the DM command and the condition (S220).

Upon completing the setting (S220), the terminal 200 monitors whether the condition is satisfied, namely, whether a certain time interval arrives or whether the power-off command has been received from the user although the certain time interval does not arrive (S230).

If it is monitored that the certain time interval arrives or the power-off command has been received from the user although the certain time interval does not arrives (S230), the terminal 200 selectively performs the user interaction according to the condition-value (S240). Here, if the user does not grant the executing of the DM command, the process is terminated.

However, if the user grants the executing of the DM command, the terminal 200 executes the DM command (S250).

FIG. 5 is a flow chart illustrating a DM scheduling method in accordance with a third embodiment of the present invention.

FIG. 5 illustrates a method for executing a DM command when power is on after a specific time point, in order to overcome the problem of the related art that the DM command failed to be executed because the power was in the off-state at the specific time point, but a condition to execute the DM command was the specific time point.

First, the terminal 200 receives a DM scheduling context including the DM command and the condition to execute the DM command at a specific time point (S310). Here, the received DM scheduling context may also include a condition-value as aforementioned.

The terminal 200 then installs the DM scheduling context by setting the DM command and the condition to execute the DM command (S320).

Upon completing the setting (S320), the terminal 200 monitors whether the specific time point arrives, or whether the power was in an off-state at the specific time point and a power-on command is then received after the specific time point (S330).

According to the monitoring, if it is confirmed that the specific time point arrives, or the DM command failed to be executed due to the power-off of the terminal at the specific time point and the power-on command has been received from the user after the specific time point (S330), the terminal 200 performs the user interaction or notifies the DM server 100 of the fact (S340).

Afterwards, the terminal 200 executes the DM command (S350).

The method according to the present invention having explained may be implemented by software, hardware, or a combination thereof. For example, the method according to the present invention may be implemented as codes or command words within a software program, which is able to be performed by a processor (e.g., a microprocessor within the mobile terminal), and also such software program may be stored in storage media (e.g., an inner memory of a mobile terminal, a flash memory, a hard disc, etc.).

As described above, the present invention can overcome the disadvantage that the DM has failed to be performed on time due to the power-off by monitoring whether the condition to execute the DM command is satisfied together with whether the power is on or off and then executing the DM command accordingly.

In addition, the present invention can always maintain an optimal state by allowing the DM to be performed before the power is on or off even when the DM is not performed due to an abnormal operation of the terminal.

The invention claimed is:

1. A method for performing, by a mobile terminal, a command for managing the mobile terminal, the method comprising:

receiving, by the mobile terminal from a server, information including the command for managing the mobile terminal and a condition for performing the command using a Device Management (DM) protocol via a DM session with the server, wherein the condition specifies certain time intervals to execute the command;

installing, by the mobile terminal, the information received from the server;

monitoring, by the mobile terminal, whether the condition is satisfied for performing the command;

determining, by the mobile terminal, whether a power of the mobile terminal had been turned-off during the certain time intervals and then the power has been turned on after the certain time intervals;

performing, by the mobile terminal, the command for managing the mobile terminal after the power has been turned on, if it is determined that the command has not been performed at the certain time intervals as the power had been turned-off during the certain time intervals and then the power has been turned on after the certain time intervals;

selectively performing a user interaction with respect to whether to execute the command before executing the command;

reporting, by the mobile terminal to the server, a processing result of the installing of the information in the mobile terminal; and notifying the server, by the mobile terminal, that the command was not executed at the certain time intervals if it is determined that the power of the mobile terminal had been turned-off during the certain time intervals and then the power has been on after the certain time intervals, when a condition-value is to inform the server, before performing the command after the power has been turned on.

2. A mobile terminal comprising:

a memory;

a processor operatively coupled with the memory and including:

a first module configured to receive information including a command for managing the mobile terminal and a condition for performing the command, and to install the information after receiving the information, wherein the condition specifies certain time intervals;

a second module configured to monitor whether the condition is satisfied and to determine whether a power had been turned-off during the certain time intervals and then the power has been turned on after the certain intervals;

a third module configured to perform the command for managing the mobile terminal after the power has been turned on, if it is determined the command has not been performed at the certain time intervals as the power had been turned-off during the certain time intervals and then the power has been turned on after the certain time intervals; and a fourth module configured to selectively perform a user interaction with respect to whether to execute the command, wherein the third module notifies the server that the command was not executed at the certain time intervals if it is determined that the power of the mobile terminal has been turned-off during the certain time intervals and then the power has been turned on after the certain time intervals, when a condition-value is to inform the server, before performing the command after the power has been turned on.

3. The method of claim 1, wherein the condition-value is included in the information, and instructs the mobile terminal whether to perform a user interaction or to inform the server, when the command has not been successfully executed due to the power of the mobile terminal being turned-off during the certain time intervals.

4. The mobile terminal of claim 2, wherein the condition-value is included in the information, and instructs the mobile terminal whether to perform a user interaction or to inform the server when the command has not been successfully executed due to the power of the mobile terminal being turned-off during the certain time intervals.

* * * * *